Figure 1:
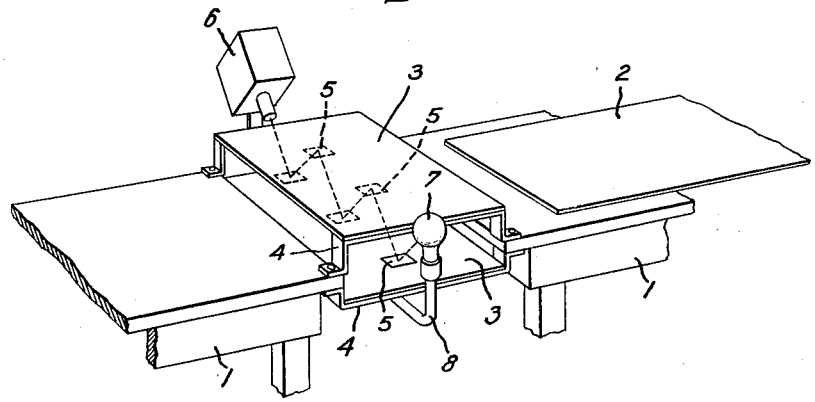

March 8, 1932. A. S. FITZ GERALD 1,848,874

TRANSPARENCY MEASURING APPARATUS

Filed Sept. 25, 1929

Inventor:
Alan S. Fitz Gerald,
by Charles E. Tullar
His Attorney.

Patented Mar. 8, 1932

1,848,874

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

TRANSPARENCY MEASURING APPARATUS

Application filed September 25, 1929. Serial No. 395,190.

The present invention relates to light-sensitive apparatus and more particularly to devices for measuring or comparing the light permeability of transparent materials.

It has been the usual practice heretofore in determining the degree of translucency or transparency of a material to intercept a light beam by the material and to register or otherwise indicate the intensity of the light passed through the material by means of a device which translates the light into electric current. The relative magnitudes of current obtained when several materials are successively tested in this manner serve as an indication of the relative light transparencies of the various materials. It has been found that when selenium cells are employed as the light responsive member, the operation is sluggish and insensitive. On the other hand, photo-electric tubes are much more sensitive than selenium in producing a greater variation of output current for a corresponding change in light permeability but fail to give sufficiently accurate determination of comparisons when employed in the usual manner in grading materials whose indexes of transparency are nearly alike and of a high order. Materials of this kind include show window glass, automobile plate glass, certain kinds of celluloid and mica which must conform to rigid specification as to quality of transparency. Photo-currents produced in a light-sensitive device of the photo-electric type are relatively small and necessitate one or more stages of amplification, usually thermionic devices, to provide currents of practical magnitude. It is apparent that not withstanding the quality and high degree of amplification that can be derived under certain circumstances, the amplified output current will be impressed with indistinctiveness and inaccuracy in case the impulses delivered to the grid of the first stage by the photo-electric tube are not properly discriminatory in grading the various intensities of light transmitted through the respective materials. Moreover, unless an amplifier of the most efficient design be employed, and even then in some cases, the photo-current component of the amplified output may be considerably masked by impulses introduced into the amplifier due to stray currents and leakages. It is therefore desirable not only to improve the quality of the photo-currents as they reach the first stage but also to reduce the number of amplifying stages to a minimum. In accordance with my invention, I propose to utilize a photo-electric tube instead of selenium as the light responsive device and to improve each of the factors referred to, relating to the subsequent amplification, by producing a greater variation of light impinging on the tube in response to a given difference in transparency than is offered by prior art apparatus.

Figure 2:
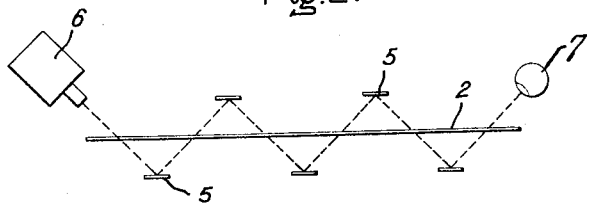
Figure 3:
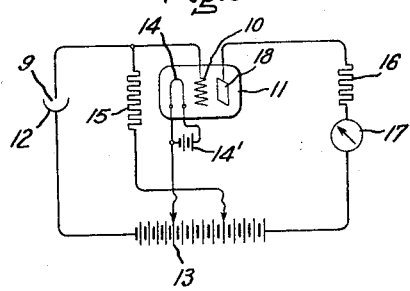
Figure 4:
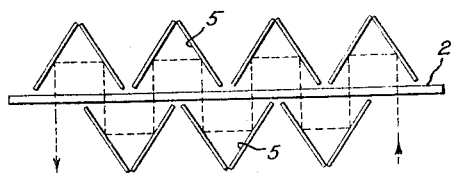

An object of the present invention is to provide an improved apparatus and method of operating the same for comparing the relative light permeabilities of two or more materials with a view toward introducing greater sensitivity and accuracy into the determinations than is afforded by the prior devices and processes of this character. This object is attained, in brief, by projecting the light through the material under test a plurality of times before the light is allowed to impinge on the photo-electric tube. It is apparent that under these conditions the light which reaches the tube and thereafter is translated into electric current represents the difference between the light initially applied to the material and the total light absorbed by the latter during the repeated light excursions and hence becomes a function of the light transmission efficiency of the material. The greater the number of interceptions by the light beam, the greater will be the accuracy of the determinations and the less will be the amount or sensitivity of amplification necessary to detect the slight differences in the respective transparencies. The invention will be better understood when reference is made to the accompanying drawings in which Fig. 1 represents a view in perspective of the improved apparatus; Fig. 2 is a diagram illustrating the relative positions of the optical system and the light-sensitive device; Fig. 3 shows in diagrammatic form an electrical circuit for energizing the photo-electric tube and for amplifying the photo-currents while Fig. 4 illustrates a modification of the apparatus.

In Fig. 1, numeral 1 indicates two tables or platforms spaced apart, one of which supports a sheet 2 of material whose light permeability is to be measured or compared with a standard. Between the tables and supported therefrom, there are positioned two flat parallelly arranged plates 3, 3 of any inexpensive material such as wood, sheet iron, etc. the edges of which are secured to the tables by means of metal brackets 4, 4 or in any other manner. The plates 3, 3, together with the retaining brackets constitute a compartment through which the sheet 2 may be moved during operation from one table to the other. To the interior surface of plates 3, one or more pairs of cooperating light reflective members are affixed, shown as plate mirrors 5, and arranged in the manner hereinafter specified. A projector lamp 6 of any suitable design and capable of attaining a sharp focus may be positioned at one end of the compartment and a photo-electric tube 7 at the other end by means of standard 8, secured to the bottom plate 3. It will be observed that the lamp 6, tube 7 and mirrors 5 preferably should be arranged in line and so positioned that the light from the lamp is reflected a plurality of times before it impinges on the photo-electric tube with a minimum amount of refraction or surface reflection from the material undergoing test. The most suitable positions for the mirrors may be determined best by experiment but in general the beam of light should be projected through the material as nearly normal to the surface as possible. An optical arrangement which allows the light to traverse the material exactly normal to its surface is shown in Fig. 4 described hereinafter. The light beam thus successively traverses the space in the compartment between the light emitting device and the light-responsive member so that when the sheet 2 whose specific light transparency is to be determined or compared with a standard is moved into the compartment, the light beam passes through the sheet many times.

A typical circuit which has been found to operate satisfactorily in case a light sensitive device of the photo-electric type is employed, is diagrammatically illustrated in Fig. 3. The anode of the photo-electric tube designated by numeral 9 is connected to the grid 10 of a thermionic amplifier 11 or to the first stage of a multi-tube set, while the cathode 12 of said tube is joined to the negative terminal of a source of electromotive force 13. The filament 14 of the amplifier may be energized by a battery 14' and is connected to an adjustable tap on the source 13. The grid 10 may receive a bias from battery 13 through an adjustable tap and a resistance 15. The output circuit of the amplifier includes a current limiting resistance 16, a current indicating device 17 and is connected between the plate 18 and the positive terminal of the source of electromotive force 13.

It is apparent that when the sheet 2 is moved into operative position, light from the lamp passes through the sheet and if proper well-known precautions are taken when necessary to prevent the light from spreading over the material, e. g. by providing light baffles (not shown), the beam will traverse the latter, finally impinging upon the photo-electric tube 7. At each interception, a certain portion of the light is absorbed and the remaining portion is forwarded to one of the mirrors to be re-directed, the latter portion bearing a direct relation to the degree of transparency of the material. It is evident that the nature of the material may be such that the transparency characteristic determined in this manner, may serve as an accurate indication of average thickness of material or degree of uniformity of thickness over a given portion of the surface or even the quality of the material from a texture standpoint in addition to quality of material from a light transmission point of view. The light which finally reaches the photo-electric tube represents the difference in the total amount of light passed on successively by the mirrors and the light absorbed by the material at each interception thus adding together, as a geometrical series, the losses of light and producing a much greater effect by way of sensitivity on the apparatus as a whole than if only one interception were provided. The differences in transparency of the various sheets of material are thus magnified as many times as there are interceptions and this feature can be carried to an extent such that there is absorbed all but a sufficient quantity of light effectively to register on the photo-electric tube. The photo-currents produced in this manner are impressed with accuracy of transparency determination and may be amplified by one or more stages of thermionic devices indicated in a general manner by the member 11, and caused to actuate the milliammeter or other current indicating device 17. The latter may be calibrated in terms of transparency thicknesses, qualities of material or may bear other indications predicated upon light transmission efficiencies. In the modification shown in Fig. 4, the reflecting surfaces 5 are disposed at such an angle with respect to the material 2 that the light is directed through the material practically normal thereto, thereby reducing refraction losses to a minimum. It will be understood that this optical system may be substituted for that shown in Fig. 1. It is evident that irrespective of the kind of optical system employed, the variations of photo-current produced in the photo-electric tube 7 are magnified in proportion to the number of light interceptions and the impulses or stimuli applied to the grid of the first stage are considerably stronger than when only one interception is provided as in prior apparatus. The number of amplifying stages may thus be reduced in substantial degree without sacrificing the amount of current output which reduction is advantageous in that leakage losses and other impulse-masking effects are minimized.

In the event it is desired to compare an unknown transparency with that of a standard without resorting to absolute measurements, it is obvious that a pair of photo-electric tubes may be arranged in the well known balance bridge arrangement (not shown). The tubes may be activated by a common source of light, one beam from which passes through the body of standard transparency and another beam traverses the object of unknown transparency, termed "sample" for convenience. The advantage of a plurality of light interceptions in accordance with my invention may be obtained if desired, by cutting off pieces of the standard to form a stack through which the light is projected while the sample may be presented to the light by means of the multi-reflection apparatus described herein. It will be understood that if desired, the apparatus shown herein may also be employed for the balancing portion of the system. In case a stack of material is used in the manner set forth the number of layers therein must conform to the number of light interceptions obtained by the multi-reflection effect in the sample if a proper comparison is to be made. The bridge will become unbalanced in case the light traversing the standard material and impinging on one photo-electric tube is unequal to the light propagated through the sample during the several interceptions and impinging on the other photo-electric tube.

It will occur to those skilled in the art that the proposition of multi-reflection has the advantage over the feature of utilizing a single light projection or traverse cooperating with a stack of the material, referred to hereinbefore, in that it avoids the necessity of cutting and placing together pieces of material in order to obtain a combined thickness effect and multiple light traverse although it will be understood that this feature comes within the purview of my invention. It will further be evident that my invention is not limited to the use of a plurality of mirrors but contemplates the employment of a single mirror whose length is sufficient to produce a multi-reflection effect or any other means to redirect the light beam after each traverse of the material.

What I claim as new and desire to secure by Letters Patent of the United States is:

1. In the art of comparing the transparency of one material with that of another material when the difference of the transparencies is so small as to preclude measurement by a single propagation of light through the materials, the method which consists in projecting light through each of the materials a plurality of times whereby the succeeding light excursions accumulate the differences in the respective transparencies, then comparing the amounts of light finally emerging from the materials in terms of light currents whereby the accumulated transparency difference is translated into electric currents from which the unit difference of transparency may be accurately determined.

2. A device for comparing the transparency of one material with that of another material whose transparencies approach so close to one another as to preclude measurement of the transparency difference by a single propagation of light through the materials, said device comprising a source of light, means for causing the light to traverse each material a plurality of times whereby the difference of transparency is accentuated in proportion to the number of light excursions and means for translating the light which finally emerges from each material into electric currents from which the unit difference of transparency may be accurately determined.

3. A device for determining the transparency of material with an accuracy which is unattainable by a single propagation of light through the material, said device comprising a source of light, means for causing the light to traverse the material a plurality of times whereby the degree of transparency is multiplied in proportion to the number of light excursions, and means for translating the light which finally emerges from the material into an electric current whose magnitude represents a measure of the multiplied degree of transparency and from which the unit measure of transparency may be accurately determined.

In witness whereof, I have hereunto set my hand this 24th day of September, 1929.

ALAN S. FITZ GERALD.